(12) United States Patent
Kim (10) Patent No.: US 7,530,724 B2
(45) Date of Patent: May 12, 2009

(54) LIGHT EMITTING LAMP, BACKLIGHT UNIT HAVING THE SAME, AND FOR MANUFACTURING THE SAME

(75) Inventor: Seung Jun Kim, Busan-si (KR)

(73) Assignee: LG. Display Co., Ltd., Seoul (KR)

( * ) Notice: Subject to any disclaimer, the term of this patent is extended or adjusted under 35 U.S.C. 154(b) by 247 days.

(21) Appl. No.: 11/479,300

(22) Filed: Jun. 29, 2006

(65) Prior Publication Data
US 2007/0097706 A1    May 3, 2007

(30) Foreign Application Priority Data
Oct. 28, 2005    (KR) ...................... 10-2005-0102277

(51) Int. Cl.
*F21V 7/04* (2006.01)
(52) U.S. Cl. .................. 362/614; 362/260; 313/494
(58) Field of Classification Search ................ 362/225, 362/249, 260, 29, 561; 349/70–71, 147; 313/306, 318.01–318.02
See application file for complete search history.

(56) References Cited

U.S. PATENT DOCUMENTS 6,674,250 B2 *   1/2004  Cho et al. ................... 315/291
6,843,584 B2 *   1/2005  Bang et al. .................. 362/249
7,255,453 B2 *   8/2007  Kim et al. .................... 362/29

FOREIGN PATENT DOCUMENTS

JP    2002-008408    1/2002
JP    2004-079268    11/2004

OTHER PUBLICATIONS

First Office Action for corresponding Chinese Patent Application Serial No. 2006100943383, dated Dec. 28, 2007.
Office Action issued in corresponding Chinese Patent Application No. 200610094338.3; issued Jun. 13, 2008.

* cited by examiner

*Primary Examiner*—Ali Alavi
(74) *Attorney, Agent, or Firm*—Brinks Hofer Gilson & Lione (57) ABSTRACT

A light emitting lamp and a backlight unit having the same are disclosed. The light emitting lamp is capable of reducing a tube voltage thereof and increasing an effective light emitting region via an increased area of external electrodes. The light emitting lamp includes a linear lamp tube having a plurality of protuberances formed at both ends thereof, and first and second external electrodes externally arranged at both ends of the lamp tube and having a plurality of protuberances to be engaged with the protuberances of the lamp tube.

29 Claims, 6 Drawing Sheets

LIGHT EMITTING LAMP, BACKLIGHT UNIT HAVING THE SAME, AND FOR MANUFACTURING THE SAME

This application claims the benefit of the Korean Patent Application 10-2005-0102277, filed on Oct. 28, 2005, which is hereby incorporated by reference as if fully set forth herein.

BACKGROUND

1. Technical Field

The present invention relates to a backlight unit, and more particularly, to a light emitting lamp which is capable of reducing a tube voltage thereof via an increased area of external electrodes while not reducing an effective light emitting region, and a backlight unit having the same.

2. Discussion of the Related Art

Of commonly used display devices, cathode ray tubes (CRTs) are mainly used in monitors of TVs, measuring instruments, information terminals, and the like. However, CRTs do not meet the requirements of compact-size and light-weight of electronic products due to their heavy weight and large size.

In the tendency towards compact-size and light-weight of a variety of electronic products, CRTs have limitations in reducing their weight and size. Examples of display devices to substitute for CRTs include liquid crystal display (LCD) devices utilizing electroluminescent optical effects, plasma display panels (PDPs) using gas discharge, and electroluminescence display (ELD) displays using electroluminescent effects. Of these display devices, in particular, LCD devices are being actively researched.

LCD devices have been actively developed as a substitute for CRTs because of a lot of outstanding advantages thereof, for example, light-weight, compact-size, and low energy consumption. Recently, LCD devices reach the stage of sufficiently implementing the role of flat panel display devices, and are most widely used as monitors of desktop computers and large-scale information display devices as well as monitors of laptop computers. Accordingly, demand for LCD devices is continuously increasing.

Since most LCD devices are light-receiving devices for regulating the intensity of light incident thereto from the outside to display pictures and images, they essentially require the use of additional light sources, namely, backlight units, for irradiating light onto LCD panels.

Generally, depending on the arrangement of cylindrical light emitting lamp(s), backlight units used as light sources of LCD devices are classified into edge-type backlight units and direct-type backlight units.

Firstly, in a conventional edge-type backlight unit in which a lamp unit is arranged at either lateral side of a light guide plate for guiding light emerged from the lamp unit, the lamp unit includes a light emitting lamp, lamp holders inserted to both ends of the lamp to protect the lamp, and a lamp reflection plate wrapped around the lamp, one side of the lamp reflection plate being fitted to a face of the light guide plate and adapted to reflect the light incident thereto from the lamp toward the light guide plate.

Such an edge-type backlight unit, in which a lamp unit is arranged at either lateral side of a light guide plate, is mainly applied to relatively small-sized LCD devices, such as monitors of laptop computers and desktop computers, and has a good light uniformity and long life-span, and is advantageous in achieving thinness of LCD devices.

On the other hand, as the size of LCD devices is increased to 20 inches or above, active developments on direct-type backlight units are being made nowadays. According to the direct-type backlight units, a plurality of lamps are arranged in one direction on a lower surface of a diffusion plate so that light is directly irradiated over the entire surface of an LCD panel.

The direct-type backlight unit has higher light use efficiency than the edge-type backlight unit, and therefore, is mainly employed in large-screen LCD devices requiring high brightness.

However, since LCD devices employing the direct-type backlight unit are used in large-sized monitors and television sets, the time of use thereof is longer than that of laptop computers, and the number of lamps used is greater than that of the edge-type backlight unit. Accordingly, the possibility that the lamps are not turned on due to an exhausted life span and failure thereof is more increased in the direct-type backlight unit as compared to the edge-type backlight unit.

Also, in the edge-type backlight unit in which lamp units are arranged at opposite sides of a light guide plate, respectively, even if one of lamps is not turned on due to an exhausted life and failure thereof, it has less serious effect except for deterioration in brightness on a screen. However, in the direct-type backlight unit in which a plurality of lamps are mounted on a lower surface of a screen, if one of the lamps is not turned on due to an exhausted life and failure thereof, a region where the lamp is not turned on is significantly darker than the remaining region. As a result, the region where the lamp is not turned on is clearly visible on the screen.

For this reason, LCD devices using the direct-type backlight unit requires frequent exchange of lamps, and therefore, should be designed to have a configuration suitable to disassemble and assemble the lamp unit.

As lamps for use in the edge-type and direct-type backlight units, there can be used, for example, electroluminescence (EL) lamps, light-emitting diodes (LEDs), cold cathode fluorescent lamps (CCFLs), hot cathode fluorescent lamp (HCFLs), and external electrode fluorescent lamps (EEFLs).

Now, a conventional light emitting lamp will be explained with reference to the accompanying drawing.

Figure 1:
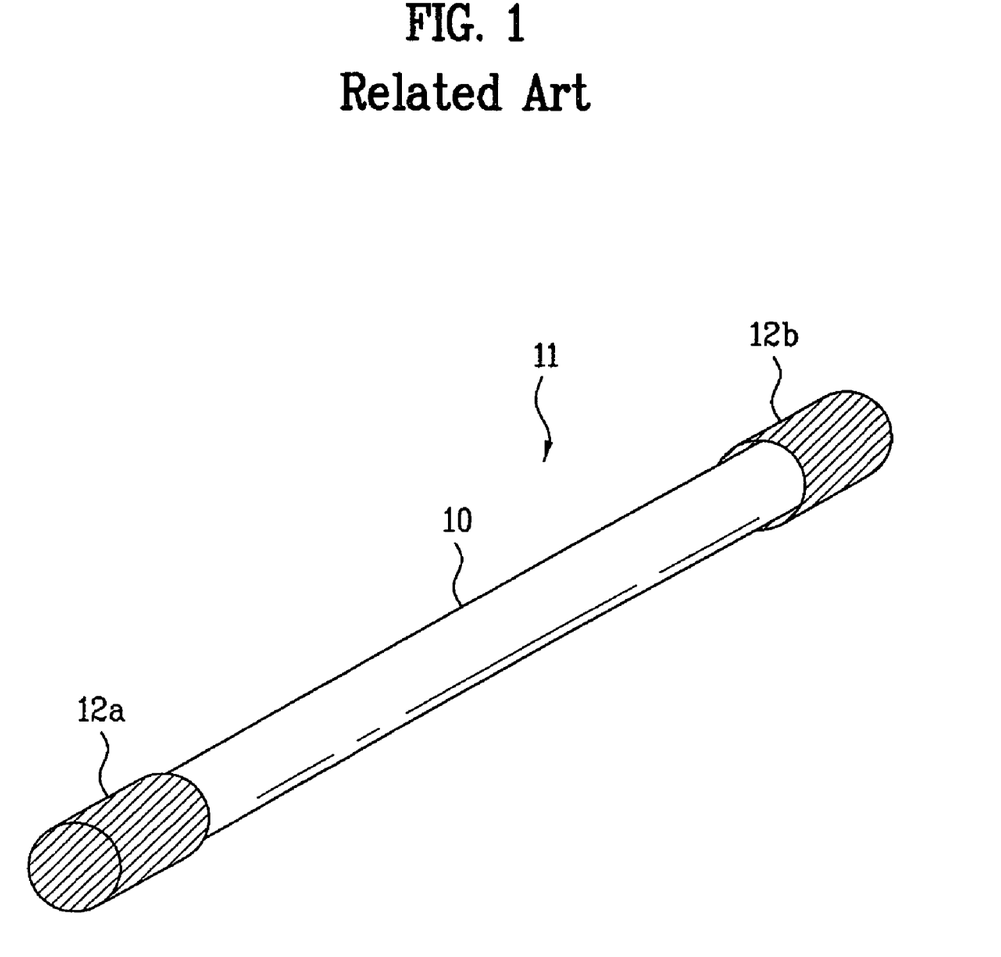
FIG. 1 is a perspective view illustrating a conventional light emitting lamp.

FIG. 1 is a perspective view illustrating a conventional light emitting lamp.

As shown in FIG. 1, the conventional light emitting lamp, which is designated as reference numeral 11, includes a lamp tube 10, and first and second external electrodes 12a and 12b externally arranged at both ends of the lamp tube 10 to be aligned in a line with respect to each other.

The conventional light emitting lamp 11 is an external electrode fluorescent lamp of a type in which caps (namely, external electrodes) are wrapped around both ends of a light emitting tube and used as a capacitor electrode, whereby a plurality of lamps can be powered in parallel by use of a single inverter.

A tube voltage to be applied to the light emitting lamp 11 is inversely proportional to a total area of the first and second external electrodes 12a and 12b (namely, a contact area between the glass tube and the caps). Accordingly, the smaller the total area of the first and second external electrodes 12a and 12b, the greater the tube voltage.

If the area of the first and second external electrodes 12a and 12b is reduced, and thus, the tube voltage is increased, there is a risk of generation of ozone inside the lamp tube. Therefore, it is necessary to increase the area of the first and second external electrodes 12a and 12b for the sake of reliability.

However, where the length of the first and second external electrodes 12a and 12b is increased to achieve a greater area of the first and second external electrodes 12a and 12b, the external electrodes 12a and 12b may encroach on an effective light emitting region, resulting in deterioration in brightness and poor quality of image.

SUMMARY

Accordingly, the disclosure is directed to a light emitting lamp and a backlight unit having the same that substantially obviate one or more problems due to limitations and disadvantages of the related art.

The disclosure provides a light emitting lamp capable of reducing a tube voltage via an increased area of an external electrode structure, and a backlight unit having the same.

A light emitting lamp includes a lamp tube having a plurality of protuberances formed at both ends and external electrodes arranged at one or more ends of the lamp tube. The external electrodes include a plurality of protuberances in contact with the protuberances of the lamp tube.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Reference will now be made in detail to a light emitting lamp and backlight unit having the same, examples of which are illustrated in the accompanying drawings. Wherever possible, the same reference numbers will be used throughout the drawings to refer to the same or like parts.

Figure 2:
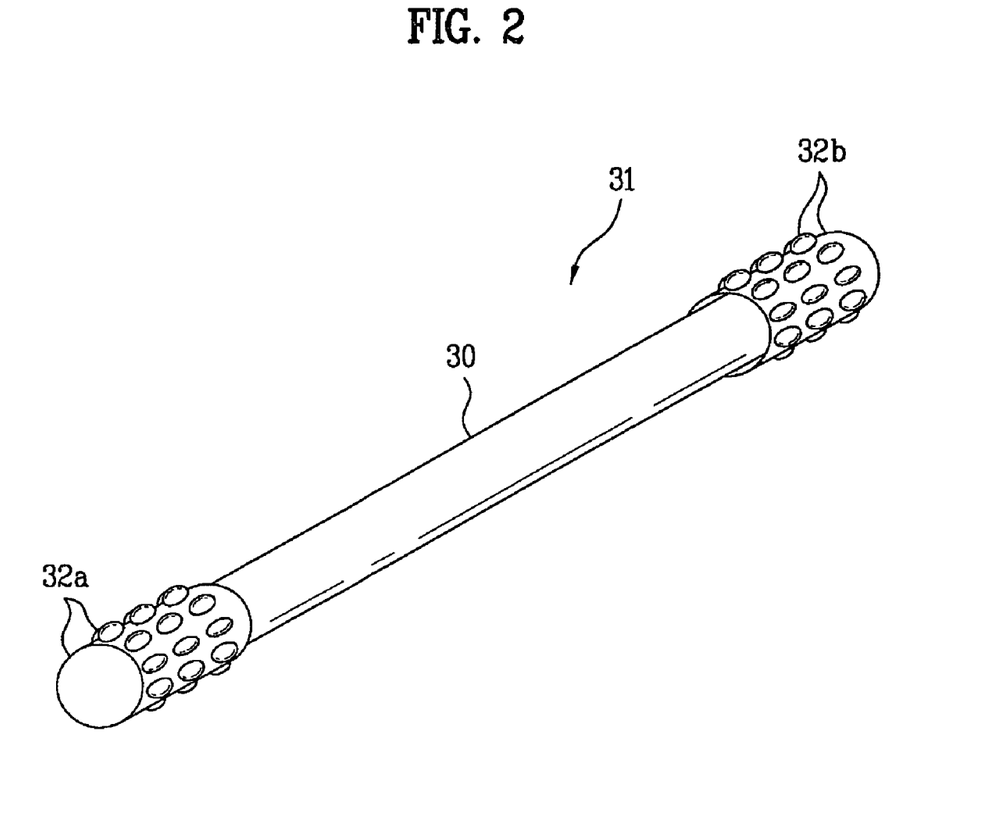
FIG. 2 is a perspective view illustrating an example light emitting lamp.
Figure 3:
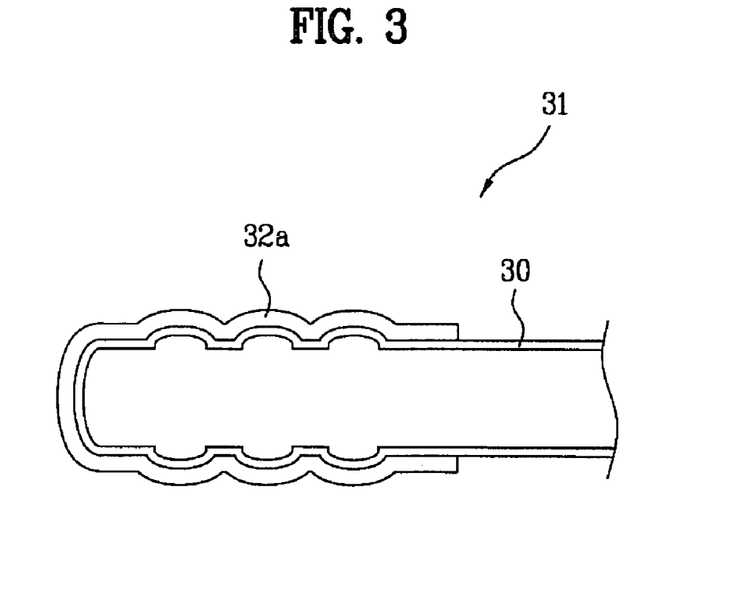
FIG. 3 is a partial sectional view of the example light emitting lamp.
Figure 4:
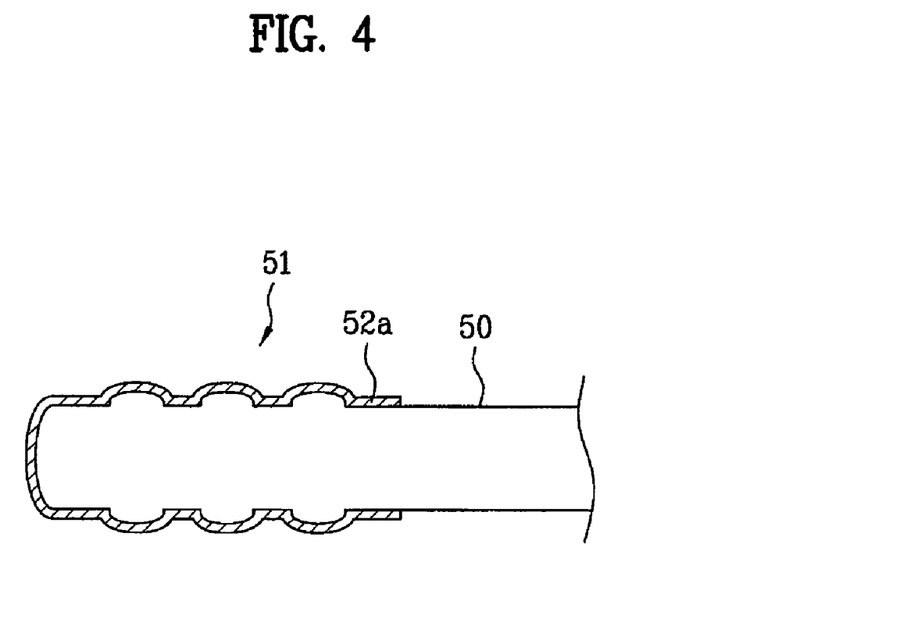
FIG. 4 is a partial sectional view illustrating a second example light emitting lamp.
Figure 5:
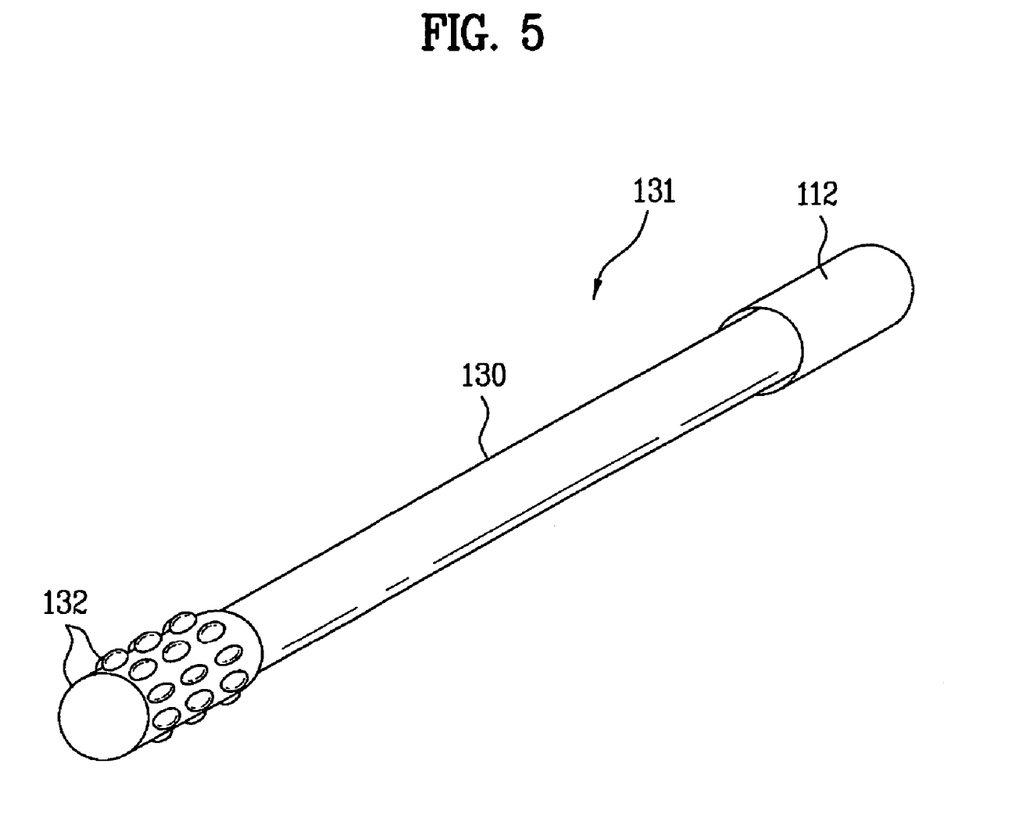
FIG. 5 is a partial sectional view illustrating a third example light emitting lamp.

FIGS. 2 and 3 are a perspective view and a partial sectional view, respectively, illustrating an example light emitting lamp. FIGS. 4 and 5 are partial sectional view illustrating a light emitting lamp, respectively.

Figure 6:
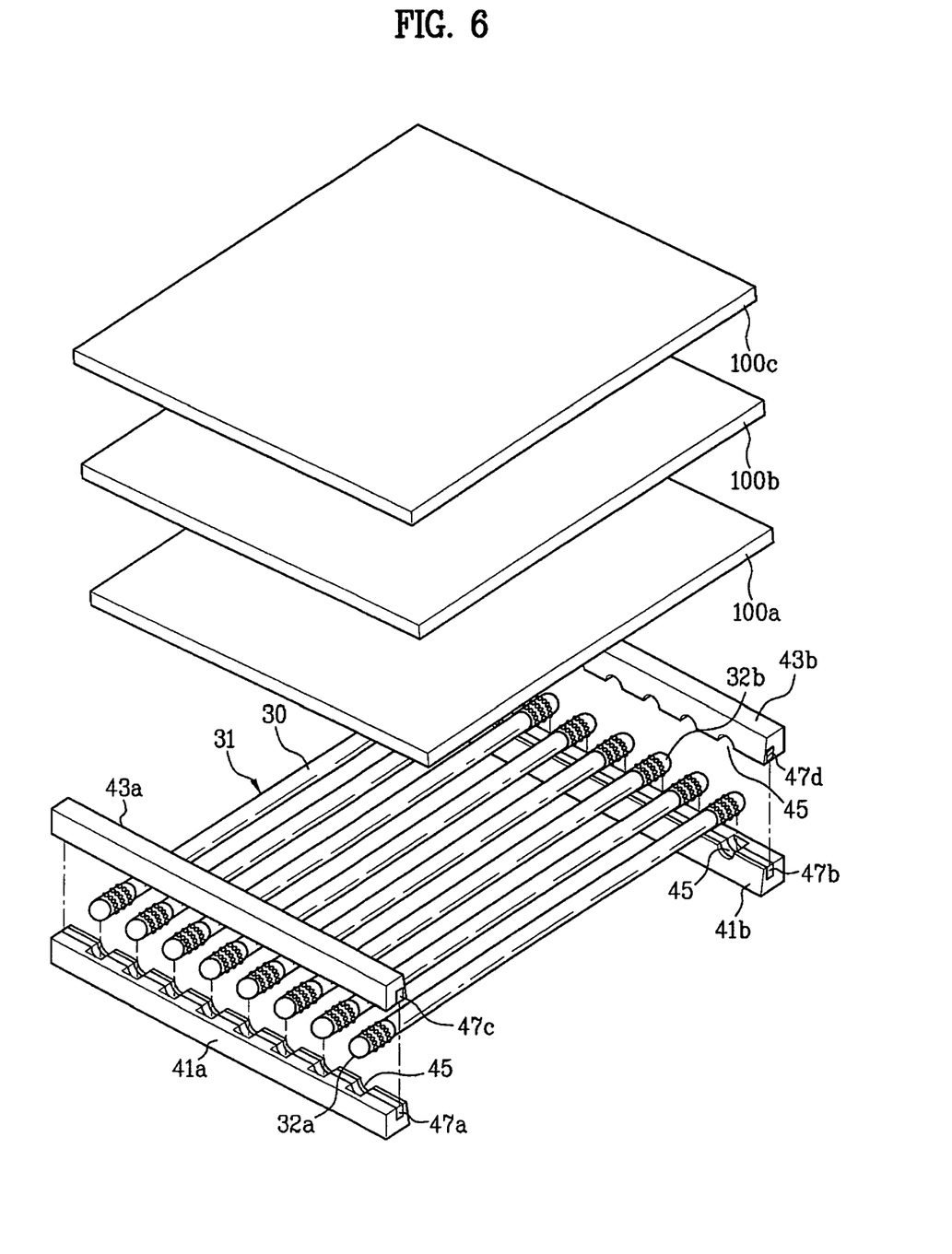
FIG. 6 is an exploded perspective view illustrating a backlight unit having a light emitting lamp
Figure 7:
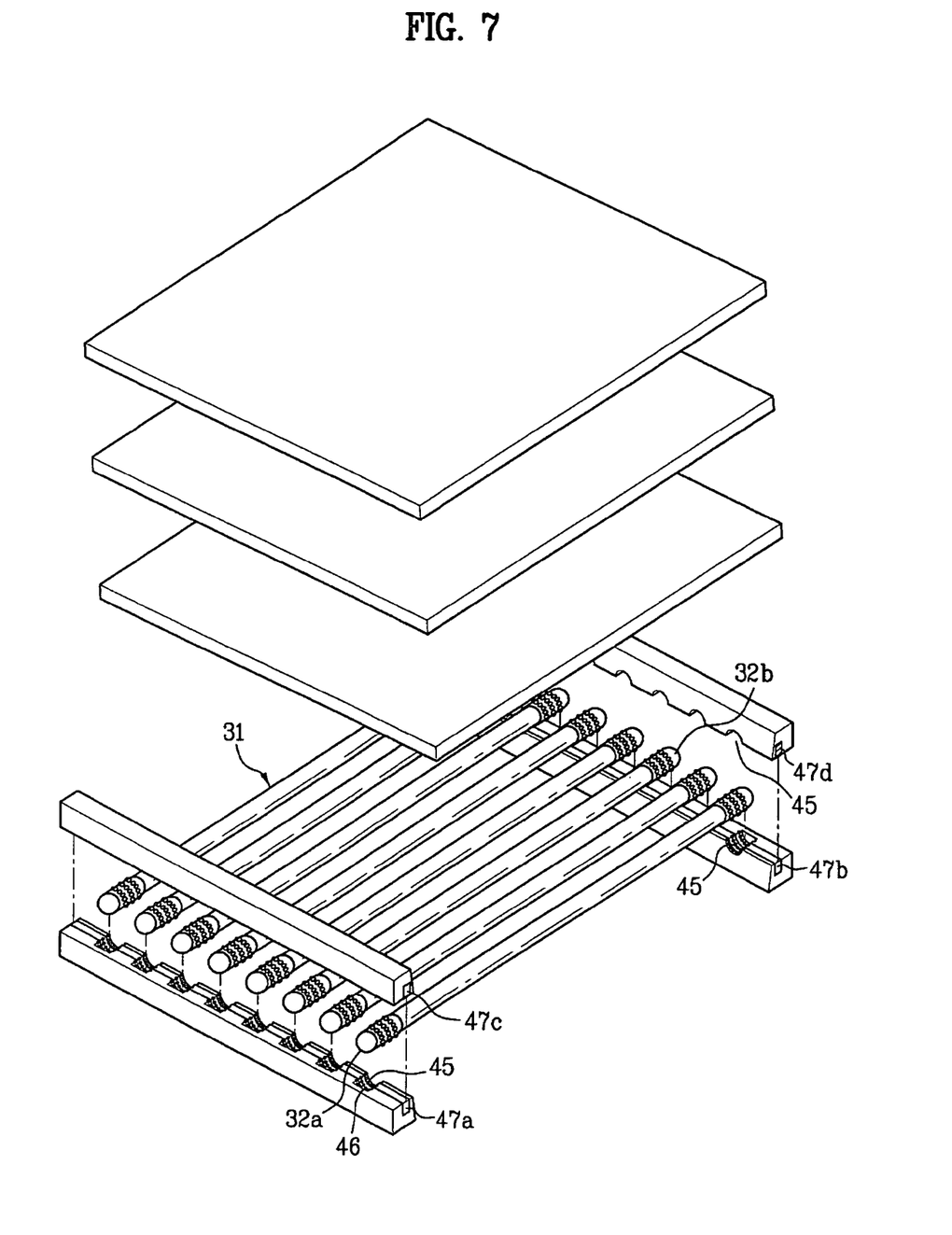
FIG. 7 is a second exploded perspective view illustrating a backlight unit having a light emitting lamp.

FIGS. 6 and 7 are exploded perspective view illustrating a backlight unit having the light emitting lamp, respectively.

As shown in FIGS. 2 and 3, the light emitting lamp 31 includes a linear lamp tube 30, and first and second external electrodes 32a and 32b externally arranged at both ends of the lamp tube 30.

The lamp tube 30 is provided at both ends thereof with a plurality of protuberances, to increase an area of an external electrode structure of the light emitting lamp 31.

The first and second external electrodes 32a and 32b have a cap shape, and are wrapped around both ends of the lamp tube 30. Also, the first and second external electrodes 32a and 32b are provided with a plurality of protuberances to be contacted with the protuberances of the lamp tube 30.

Protuberances are formed at both ends of the lamp tube 30 and the first and second external electrodes 32a and 32b to increase the contact area between the lamp tube and the first and second electrodes of the light emitting lamp 31, and consequently, to achieve an improvement in the capacitance C of the light emitting lamp 31.

Such an improvement of the capacitance C can be understood from the formula $C = \in A/d$. Here, "$\in$" is a dielectric constant of the lamp tube 30, "d" is a thickness of the lamp tube 30, and "A" is a contact area between the lamp tube 30 and the caps (i.e. the first and second external electrodes 32a and 32b).

As stated above, the light emitting lamp 31 is an external electrode fluorescent lamp EEFL of a type in which caps are wrapped around both ends of a light emitting tube and used as a capacitor electrode, whereby a plurality of lamps can be powered in parallel by use of a single inverter.

Next, as shown in FIG. 4, the light emitting lamp 51 includes a linear lamp tube 50, and a first external electrode 52a and a second external electrode (not shown) externally arranged at both ends of the lamp tube 50. The lamp tube 50 is provided at both ends thereof with a plurality of protuberances, to increase a contact area between the lamp tube and the first and second electrodes of the light emitting lamp 51. The first and second external electrodes are formed by thinly coating a conductive material on an outer surface of the lamp tube 50 at regions where the protuberances are formed.

Specifically, the first and second external electrodes are coatings formed by dipping both ends of the lamp tube 50 in a lead solution filled in a vessel.

The above description describes first and second embodiments in which the protuberances are located at both ends of the lamp tube and the first and second external electrodes. However, the embodiments are not limited to this embodiment. Namely, as shown in FIG. 5, the light emitting lamp 131 includes a linear lamp tube 130, and a first external electrode 132 with a plurality of protuberances and a second external electrode 112 without protuberances. The first and second external electrodes externally arranged, respectively, at both ends of the lamp tube 130. The lamp tube 130 is provided with a plurality of protuberances in the position corresponding to the protuberances of the first external electrode 132, thereby increasing a contact area between the lamp tube and the first electrodes of the light emitting lamp 131.

In the first, second and third embodiments, the external electrodes are formed of a solid conductive material or a gel conductive material.

As stated above, by providing both ends of the lamp tube 30 or 50 with the protuberances, and also, providing the first and second external electrodes, located at both ends of the lamp tube, with the same protuberances as those of the lamp tube, the disclosure can achieve an increase in an area of the resulting external electrode by protuberances thereof, and thus, can achieve a reduced tube voltage. The increased area of the external electrode structure by adding protuberances also ensures and even increases a sufficient effective light emitting region, resulting in an improvement in brightness and image quality.

Hereinafter, a backlight unit employing the light emitting lamp as stated above will be explained. As shown in FIG. 6, the backlight unit includes a plurality of light emitting lamps 31 arranged parallel to each other in one direction. As stated above, each of the light emitting lamps 31 includes the linear lamp tube 30 formed at both ends thereof with the plurality of protuberances and the first and second external electrodes 32a and 32b externally arranged at both ends of the lamp tube 30 and formed with the plurality of protuberances to be contacted with the protuberances of the lamp tube 30.

The first and second external electrodes may be formed of a solid conductive material or a gel conductive material.

The backlight unit further includes first and second lower supports 41a and 41b and first and second upper supports 43a and 43b, which cooperate with each other to fixedly mount and support the light emitting lamps 31 therebetween. More particularly, the first and second lower supports 41a and 41b are spaced apart from each other by an appropriate distance determined based on the length of the light emitting lamps 31, and are formed at their upper surfaces with a plurality of recesses 45 capable of receiving the plurality of light emitting lamps 31 with the protuberances at both ends thereof. The first and second upper supports 43a and 43b are spaced apart from each other by the same distance as that of the first and second lower supports 41a and 41b, and are formed at their lower surfaces with a plurality of recesses 45 capable of receiving the plurality of light emitting lamps 31 with the protuberances at both ends thereof.

The upper surfaces of the first and second lower supports 41a and 41b and the lower surfaces of the first and second upper supports 43a and 43b, where the recesses 45 are formed, are provided with conductive layers 47a, 47b, 47c, and 47d, respectively. The conductive layers 47a, 47b, 47c, and 47d are used to apply power to the light emitting lamps 31. The conductive layers 47a, 47b, 47c, and 47d are formed of a solid conductive material or a gel conductive material.

At this time, it should be noted that an outer appearance of the recesses have the same shape with either the same shape or different shape in respect with an outer appearance of either end of each light emitting lamp. It is possible that the recesses 45 may have no cavity on the outer appearance thereof as shown in FIG. 6, or a plurality of cavities 46 on the outer appearance thereof as shown in FIG. 7, wherein the respective cavity functions to receive the respective protuberance of the light emitting lamp.

Although the recesses 45 comprises no cavity as shown in FIG. 6, the external electrodes 32a and 32b with the protuberances can be contacted with the conductive layer 47a, 47b, 47c, and 47d by using the gel conductive material as either the conductive layers or the external electrodes.

Meanwhile, the recesses 45 are shaped and sized to prevent distal ends of the light emitting lamps 31 from being seen when viewed from the outside in a state wherein the first and second lower supports 41a and 41b are engaged with the first and second upper supports 43a and 43b. For this, pairs of the recesses 45 have the same shape and size as the outer appearance of the distal ends of the light emitting lamps 31. Alternatively, the recesses 45 may be designed to expose the distal ends of the light emitting lamps 31 when viewed from the outside in a state wherein the first and second lower supports 41a and 41b and first and second upper supports 43a and 43b are in surface contact with each other.

The conductive layers 47a, 47b, 47c, and 47d are extended in a longitudinal direction of the respective supports along the surfaces of the supports where the recesses 45 are formed. The conductive layers conductively contact with the protuberances via the recesses 45.

Arranged above the first and second upper supports 43a and 43b in sequence are light scattering means such as a diffusion plate 100a, and diffusion sheets 100b and 100c. The diffusion plate 100a and diffusion sheets 100b and 100c are adapted to scatter light emitted from the light emitting lamps 31, to achieve uniform light distribution over a display plane of a liquid crystal display device (not shown). In general, the backlight unit above-mentioned is used by a light source of an image display device such as the liquid crystal display device.

The light emitting lamps 31 of the above described backlight unit may be configured such that the first and second external electrodes 32a and 32b are wrapped around both ends of the lamp tube 30 in the form of caps similar to the first embodiment, or such that the first and second external electrodes 32a and 32b are coated on the lamp tube similar to the second embodiment.

As apparent from the above description, a light emitting lamp and a backlight unit having the same has the following effect.

The light emitting lamp is designed to achieve an increased area of an external electrode via protuberances thereof. Therefore, the light emitting lamp can achieve a reduction in a tube voltage thereof. Furthermore, the light emitting lamp can achieve an improvement in brightness and image quality via the provision of a sufficient effective light emitting region.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A lamp tube used in a light emitting lamp, wherein the lamp tube has a plurality of protuberances formed at both ends thereof,
   wherein a plurality of row of protuberances disposed along circumferences of both ends of the tube.

2. A light emitting lamp comprising:
   a lamp tube having a plurality of protuberances formed at both ends thereof; and
   external electrodes arranged at one or more ends of the lamp tube and having a plurality of protuberances in contact with the protuberances of the lamp tube,
   wherein a plurality of row of protuberances disposed along circumferences of both ends of the tube.

3. The light emitting lamp of claim 2, wherein the external electrodes are caps wrapped around both ends of the lamp tube.

4. The light emitting lamp of claim 2, wherein the external electrodes are coating layers applied around both ends of the lamp tube.

5. The light emitting lamp of claim 2, wherein the external electrodes are formed of a solid conductive material or a gel conductive material.

6. A backlight unit, comprising:
   a plurality of light emitting lamps including a lamp tube with a plurality of protuberances at both ends thereof and external electrodes with a plurality of protuberances at both ends of the lamp tube;
   first and second lower supports located below the light emitting lamps with a plurality of recesses for receiving the light emitting lamps; and
   first and second upper supports located above the light emitting lamps with a plurality of recesses for receiving the light emitting lamps,
   wherein a plurality of row of protuberances disposed along circumferences of both ends of the tube.

7. The backlight unit of claim 6, further comprising conductive layers formed along the upper surfaces of the first and second lower supports and the lower surfaces of the first and second upper supports where the recesses are formed.

8. The backlight unit of claim 7, wherein the conductive layers are formed of a solid conductive material or a gel conductive material.

9. The backlight unit of claim 6, wherein the external electrodes are formed of a solid conductive material or a gel conductive material.

10. The backlight unit of claim 6, wherein an outer appearance of the recesses have the same shape with either the same shape or different shape in respect with an outer appearance of either end of each light emitting lamp.

11. The backlight unit of claim 6, wherein the external electrodes are caps wrapped around both ends of the lamp tube.

12. The backlight unit of claim 6, wherein the external electrodes are coating layers applied around both ends the lamp tube.

13. The backlight unit of claim 6, wherein the recesses have a plurality of cavities to receive the protuberances of the light emitting lamps.

14. The backlight unit of claim 6, wherein the first and second upper supports are spaced apart from each other by the same distance as that of the first and second lower supports.

15. The backlight unit of claim 6, wherein the recesses have identical size and shape with each other.

16. The backlight unit of claim 6, wherein the backlight unit of claims 6 is used by a light source of a liquid crystal display device.

17. A method for manufacturing a light emitting lamp, comprising the steps of:
    forming a lamp tube having a plurality of protuberances at one or more ends thereof; and
    forming external electrodes at both ends of the lamp tube,
    wherein a plurality of row of protuberances disposed along circumferences of both ends of the tube.

18. The method of claim 17, wherein the external electrodes have a plurality of protuberances in contact with the protuberances of the lamp tube.

19. The method of claim 17, wherein the external electrodes are formed by capping.

20. The method of claim 17, wherein the external electrodes are formed by coating.

21. The method of claim 17, wherein the external electrodes are formed of a solid conductive material or a gel conductive material.

22. A method for manufacturing a backlight unit, comprising the steps of:
    forming a plurality of light emitting lamps, wherein the light emitting lamps comprise a lamp tube having a plurality of protuberances at one or more ends thereof and external electrodes at both ends of the lamp tube;
    forming first and second lower supports with a plurality of recesses for receiving the light emitting lamps;
    forming first and second upper supports with a plurality of recesses for receiving the light emitting lamps; and
    assembling the first and second lower supports and the first and second upper supports with the light emitting lamps interposed there between,
    wherein a plurality of row of protuberances disposed along circumferences of both ends of the tube.

23. The method of claim 22, wherein the external electrodes have a plurality of protuberances in contact with the protuberances of the lamp tube.

24. The method of claim 22, further comprising:
    forming conductive layers along the upper surfaces of the first and second lower supports and the lower surfaces of the first and second upper supports where the recesses are formed.

25. The method of claim 24, wherein the conductive layers are formed of a solid conductive material or a gel conductive material.

26. The method of claim 22, wherein the external electrodes are formed of a solid conductive material or a gel conductive material.

27. The method of claim 22, wherein an outer appearance of the recesses are formed to have the same shape with either the same shape or different shape in respect with an outer appearance of either end of each light emitting lamp.

28. The method of claim 22, wherein the external electrodes are formed by capping.

29. The method of claim 22, wherein the external electrodes are formed by coating.

* * * * *